US008788073B2

(12) United States Patent
Embree et al.

(10) Patent No.: US 8,788,073 B2
(45) Date of Patent: Jul. 22, 2014

(54) ATHLETE SERVICE PLATFORM SUPPORTING AUGMENTED VIEWS

(75) Inventors: David Embree, Portland, OR (US); Kris Wallsmith, Portland, OR (US); Laurie Hotovy, Portland, OR (US)

(73) Assignee: Athletepath, Inc., Portland, OR (US)

( * ) Notice: Subject to any disclaimer, the term of this patent is extended or adjusted under 35 U.S.C. 154(b) by 217 days.

(21) Appl. No.: 13/310,573

(22) Filed: Dec. 2, 2011

(65) Prior Publication Data

US 2012/0221128 A1    Aug. 30, 2012

Related U.S. Application Data

(60) Provisional application No. 61/419,739, filed on Dec. 3, 2010, provisional application No. 61/420,152, filed on Dec. 6, 2010.

(51) Int. Cl.
*G06Q 30/00* (2012.01)
*G06Q 30/02* (2012.01)

(52) U.S. Cl.
CPC ..................... *G06Q 30/02* (2013.01)
USPC .............. 700/91; 705/14.49; 705/14.67

(58) Field of Classification Search
USPC .......... 700/91; 705/14.4, 14.49, 14.52, 14.53, 705/14.66, 14.67; 482/8
See application file for complete search history.

(56) References Cited

U.S. PATENT DOCUMENTS

| 2001/0034734 A1* | 10/2001 | Whitley et al. ............ 707/104.1 |
| 2007/0233569 A1* | 10/2007 | Kelley et al. .................... 705/14 |
| 2007/0287596 A1 | 12/2007 | Case, Jr. et al. |
| 2008/0010106 A1* | 1/2008 | Bourne et al. .................... 705/8 |
| 2008/0010343 A1 | 1/2008 | Escaffi et al. |
| 2008/0015819 A1* | 1/2008 | Sayre et al. ................... 702/187 |
| 2009/0210078 A1 | 8/2009 | Crowley |
| 2009/0262088 A1* | 10/2009 | Moll-Carrillo et al. ....... 345/173 |
| 2010/0160014 A1* | 6/2010 | Galasso et al. .................... 463/6 |
| 2012/0041767 A1* | 2/2012 | Hoffman et al. .............. 705/1.1 |
| 2012/0221127 A1 | 8/2012 | Embree et al. |

FOREIGN PATENT DOCUMENTS

JP    2007034478 A    2/2007

OTHER PUBLICATIONS

ISA Korea, International Search Report and Written Opinion of PCT/US2011/063331, Aug. 22, 2012, WIPO, 13 pages.

* cited by examiner

*Primary Examiner* — Damon Pierce
*Assistant Examiner* — Allen Chan
(74) *Attorney, Agent, or Firm* — Alleman Hall McCoy Russell & Tuttle LLP (57) ABSTRACT

An athlete service platform implemented by a server system receives a request for athletic performance information from a client computing device via a communications network. The request is initiated at an athlete-user interface of the client computing device. The server system attributes an athlete-user account of the plurality of athlete-user accounts to the request for the athletic performance information. The server system generates an augmented view of the athletic performance information based on the athlete-user account. The augmented view includes a first indicator defining a first sub-set of the performance information associated with the athlete-user account. The augmented view further includes a second indicator defining a second sub-set of the performance information associated with one or more related athlete-user accounts of the plurality of athlete user accounts. The one or more related athlete user accounts have a predefined relationship to the athlete-user account attributed to the request.

17 Claims, 8 Drawing Sheets

ATHLETE SERVICE PLATFORM SUPPORTING AUGMENTED VIEWS

CROSS REFERENCE TO RELATED APPLICATIONS

The present application claims priority to U.S. Provisional Patent Application No. 61/419,739, filed Dec. 3, 2010 and titled "Athletic Result Aggregation and Promotion Channel," and to U.S. Provisional Patent Application No. 61/420,152, filed Dec. 6, 2010 and titled "Athletic Result Aggregation and Promotion Channel," the entire contents of each of which are incorporated herein by reference in their entirety for all purposes.

BACKGROUND

Athletes may register for athletic events online via a website. Results of these athletic events may be published to a website accessible to the athletes after competing in the athletic events. Some website operators generate advertisement revenue from their user traffic by selling advertisement space on their websites to third-party advertisers. Advertisements delivered to these websites may be targeted to select users by an online advertisement network based on the users' prior web browsing activity.

SUMMARY

An athlete service platform implemented by a server system obtains pre-event information via a first event administrator-user interface associated with a first event administrator-user. The pre-event information includes a permission parameter, and further indicates one or more event parameters of one or more athletic events prior to athletes competing in the one or more athletic events. The server system also obtains post-event information via a second event administrator interface associated with a second event administrator-user. The post-event information includes athletic performance information for a plurality of athlete-user accounts associated with respective athletes after the athletes compete in the one or more athletic events. The second administrator-user may correspond to an administrative entity responsible for reporting and/or certifying the athletic performance information. The server system publishes the post-event information including the athletic performance information to a network location accessible to the athlete-user accounts.

The server system receives a request for the athletic performance information from a client computing device via a communications network. The request may be initiated at an athlete-user interface of the client computing device. The server system may attribute an athlete-user account of the plurality of athlete-user accounts to the request for the athletic performance information. The server system generates an augmented view of the athletic performance information based on the athlete-user account attributed to the request. The augmented view may include a first indicator defining a first sub-set of the performance information associated with the athlete-user account attributed to the request. The augmented view may further include a second indicator defining a second sub-set of the performance information associated with one or more related athlete-user accounts of the plurality of athlete user accounts. The one or more related athlete user accounts may have a predefined relationship to the athlete-user account attributed to the request. The server system may send the augmented view of the athletic performance information to the client computing device via the communications network for presentation at the athlete-user interface of the client computing device.

DETAILED DESCRIPTION

An athlete service platform serves as an information resource for athletes, athletic event administrators, advertisers, and other types of users. The athlete service platform includes a content-rich database system containing information obtained from multiple sources, including information submitted by different types of users and/or third-party data resources. The athlete service platform supports a number of different micro-portals specifically tailored to the different types of users. These micro-portals may take the form of user interfaces or dashboards through which users may access aspects of the athlete service platform, including the database system and a number of available user tools.

Figure 1:
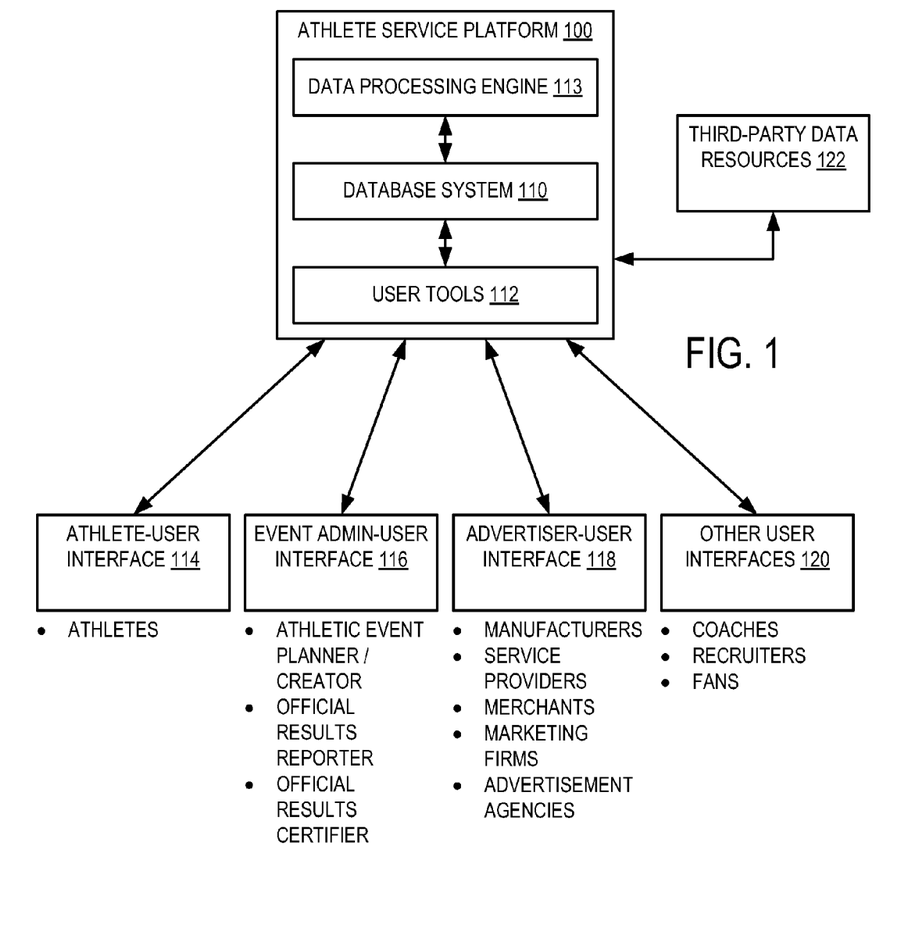
FIG. 1 is a schematic diagram depicting an example athlete service platform within an ecosystem of users.

FIG. 1 is a schematic diagram depicting an example athlete service platform 100 within an ecosystem of users, including athletes, athletic event administrators, advertisers, and other types of users. Athlete service platform 100 may include a database system 110 containing a collection of information. As one example, the collection of information may include athletic performance information for athletes competing in athletic events. Non-limiting examples of athletic events include running events, cycling events, swimming events, track and field events, team sporting events such as baseball, basketball, soccer, or football games or matches, skiing or snowboarding events, rock climbing events, skateboarding events, figure skating events, etc.

Athlete service platform 100 may further include user tools 112 enabling users to interact with the athlete service platform, including database system 110. As described in greater detail herein, athlete service platform 100 may be implemented by a server system that communicates via a communications network with client computing devices operated by respective users. The availability or accessibility of user tools 112 to individual users may be based on the type of user and/or the type of user interface used to access athlete service platform 100.

Athlete service platform 100 may further include a data processing engine 113. Data processing engine 113 may be configured to process information received by athlete service platform 100 from users and/or third-party data resource to obtain a predefined data structure, which may be stored at database system 110. Processed information of the predefined data structure may be accessed by users via respective user interfaces and/or by third-party data resources. User tools 112 and data processing engine 113 may take the form of instructions held in a storage device that are executable by a processor of a computing device, such as a server or server system, for example.

Users may access aspects of athlete service platform 100, including database system 110, user tools 112, data processing engine 113, etc. via a user interface. A number of different user interfaces may be available to different types of users. For example, athletes may interact with athlete service platform 100 via an athlete-user interface 114. Athletic event administrators, including athletic event planners, official results reporting entities (e.g., timing or officiating entities), or official results certifying entities (e.g., governing bodies) may interact with athlete service platform 100 via an event-administrator interface 116. Advertisers, including product manufacturers, service providers, merchants, marketing firms, advertisement agencies, etc. may interact with athlete service platform 100 via an advertiser-user interface 118. Other types of users (collectively third-party users), including coaches, recruiters, fans, members of the general public, etc. may interact with athlete service platform 100 via other user interfaces 120.

Athlete service platform 100 may obtain information from multiple different sources, including athletes, athletic event administrators, advertisers, other user types, and/or third-party data resources. For example, athlete service platform 100 may obtain athletic performance information from one or more third-party data resources, such as example third-party data resource 122. Third-party data resource 122 may correspond to a website or network database system that publishes athletic performance information for athletes having competed in athletic events.

Each user may be associated with a respective user account at athlete service platform 100. A user account may be associated with a particular user account type. Non-limiting examples of user account types include: an athlete-user account for athletes, an event administrator-user account for athletic event administrators, and an advertiser-user account for advertisers. Other types of user accounts may be available to third-party users. Examples of these other types of user accounts include: a team manager-user account for team managers or coaches, a recruiter-user account for athletic recruiters, and a fan-user account for members of the general public that are fans of athletes or teams. However, other suitable user account types may be supported by Athlete service platform 100.

In some examples, a user may create a user account by actively registering or signing-up with athlete service platform 100 via a user interface. Alternatively or additionally, a user account may be created on behalf of a user by athlete service platform 100 without necessarily requiring the user to actively register or sign-up with the athlete service platform. For example, a user account for an athlete may be created by athlete service platform 100 from athletic performance information obtained for an athletic event in which the athlete competed. As previously described, this athletic performance information may be obtained from third-party data resources or other types of users, even without the cooperation of the athletes.

The particular type of user interface exposed to a user by athlete service platform 100 may depend on the user account type of that user. For example, an athlete that is associated with an athlete-user account may interact with athlete service platform 100 via athlete-user interface 114. An athletic event administrator that is associated with an event administrator-user account may interact with the athlete service platform via administrator-user interface 116. An advertiser that is associated with an advertiser-user account may interact with the athlete service platform via advertiser-user interface 118. Other types of users associated with respective user account types may interact with the athlete service platform via respective other user interfaces 120.

Figure 2:
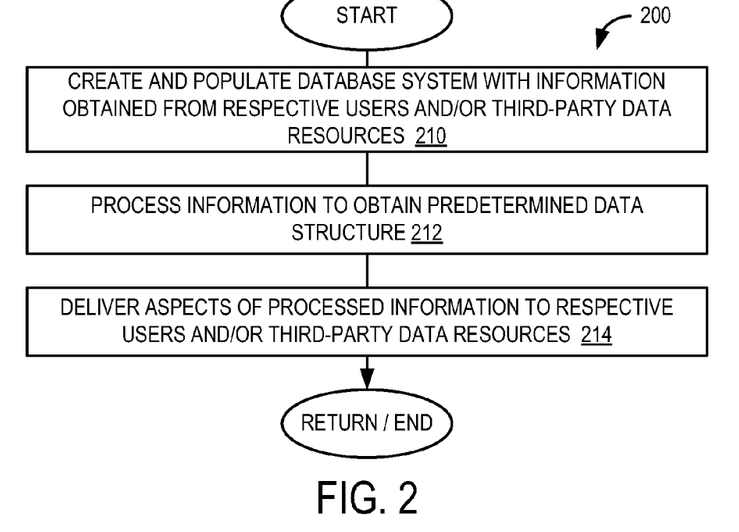
FIG. 2 is a flow diagram depicting an example method 200 for a server system implementing aspects of the athlete service platform of FIG. 1.

FIG. 2 is a flow diagram depicting an example method 200 for a server system implementing aspects of athlete service platform 100 of FIG. 1. Method 200 provides an example high-level overview of the information gathering, processing, and delivery process that may be performed by the athlete service platform.

At 210, the method may include creating and populating a database system with information obtained from respective users and/or third-party data resources. For example, a plurality of user accounts may be created for respective users. Each user account may be associated with a user account type, which may correspond to either: an athlete-user account, an advertiser-user account, an event administrator-user account, or other suitable type of user account. These users may provide information to the athlete service platform via their respective user interfaces. Information received by the athlete service platform may be stored in the database system to enable access by other users or third party data resources (e.g., websites). The athlete service platform may also request and/or receive information from third-party data resources (e.g., websites), which may in turn be stored in the database system to enable access by users or other third-party data resources. Examples of how this information may be provided to the athlete service platform are described in greater detail with reference to FIGS. 3-9.

At 212, the method may include processing the information received at 210 to obtain a predefined data structure. In some examples, the information may be processed by a data processing engine (e.g., data processing engine 113) to obtain the predefined data structure. As described in greater detail with respect to the different user interfaces and corresponding augmented views that may be supported by the athlete service platform, the information contained in the database system may be presented according to a predefined data structure applicable to the particular type of user. This predefined data structure may take any suitable form, including data structures that support the various non-limiting examples described herein. The processed information of the predefined data structure may be stored at a storage device of the athlete service platform or at a storage device accessible to the athlete service platform.

At 214, the method may include delivering aspects of the processed information of the predefined data structure to respective users and/or third-party data resources. For example, the server system may send information to a client computing device for presentation via a user interface upon receiving a request for the information from the client computing device. As another example, the server system may send information to a network location hosting a third-party data resource for publication.

Figure 3:
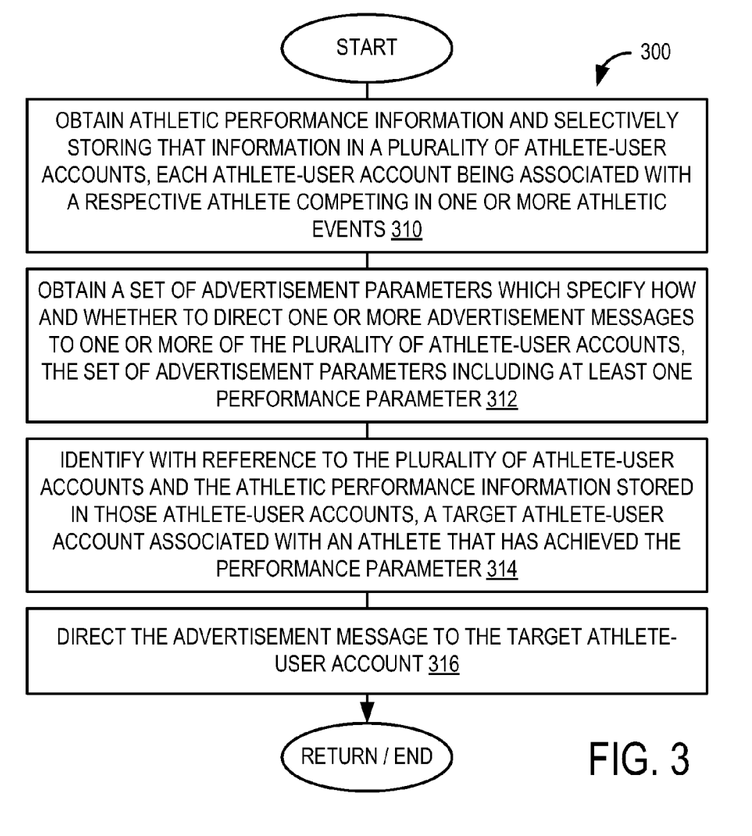
FIG. 3 is a flow diagram depicting an example method for a server system implementing further aspects of the athlete service platform of FIG. 1, including delivery of advertisement messages to target athlete-user accounts.

FIG. 3 is a flow diagram depicting an example method 300 for a server system implementing further aspects of athlete service platform 100 of FIG. 1. Method 300 describes how advertisers may direct advertisements for products or services to athletes via the athlete service platform.

At 310, the method may include obtaining athletic performance information and selectively storing that information in a plurality of athlete-user accounts. Each athlete-user account may be associated with a respective athlete competing in one or more athletic events. In some examples, previously described information processing engine 113 may be configured to selectively store the athletic performance information in the corresponding athlete-user accounts. For example, information processing engine 113 may use athlete-user identifiers associated with the performance information to identify which athlete-user accounts are to be updated with received athletic performance information.

Performance information for an individual athlete may include objective or subjective measurements of an athlete's performance while competing in the one or more athletic events. Non-limiting examples of performance information include: a race finish time or portion thereof (e.g., lap time) for an athlete competing in e.g., a running, cycling, or swimming race event; a relative place or order that the athlete finished among other athletes competing in an athletic event or series of events; a judge's score awarded to the athlete while competing in the athletic event; a maximum or minimum distance or other measurement achieved or completed by the athlete while competing in the athletic event (e.g., high-jump height, number of miles run, amount of weight lifted, a number of points scored, etc.); an objective or subjective measurement of performance of a team or an association of athletes of which the athlete is a member; or an indication of whether the athlete completed the athletic event or a portion thereof (e.g., whether the athlete did or did not complete a marathon running event, or how much of an event was completed by the athlete). It will be understood that any suitable performance information may be obtained by the athlete platform service, including other types or forms of performance information. The performance information for an athlete may be with respect to an individual athletic event, a portion of an individual athletic event, a series of multiple athletic events, a combination of multiple different types of athletic events (e.g., running, cycling, and swimming), and/or a team or association of multiple athletes of which the athlete is a member (e.g., a relay team).

The method at 310 may alternatively or additionally include obtaining athlete biographical information for the plurality of athlete-user accounts. Athlete biographical information for an individual athlete may include one or more of the athlete's: name, age, gender, physical attributes or measurements (e.g., height, weight, etc.), residence, contact information, financial billing or account information, type of athletic events in which the athlete has or is planning to compete in, geographic region of competition, whether the athlete is a professional or amateur for a particular type of athletic event, associations such as the NCAA, NFL, NBA, etc., among other suitable biographical information.

The athletic performance information and/or athlete biographical information may be received at the server system over a communications network from a computing device. The computing device may include a server hosting a third-party data resource, a client computing device operated by a user, or other suitable information source. The athletic performance information and/or athlete biographical information may be stored at the server system in association with the athlete-user accounts.

In some examples, the athlete service platform may obtain athletic performance and/or athlete biographical information from athletes via an athlete-user interface. As one example, the server system may generate an athlete-user interface or portions thereof at the server system, and may transmit the athlete-user interface or portions thereof to the computing device over the communications network to be presented via the computing device. The athletic performance information and/or biographical information received by the server system may be at least partially defined by one or more inputs provided via an athlete-user interface at the computing device.

As another example, the server system may obtain athletic performance information and/or athlete biographical information from a third-party data resource. The third-party data resource may be hosted at a server device accessible to the server system via a communications network. The server system may receive the athletic performance information and/or athlete biographical information from the server device of the third-party data resource by requesting a data resource at the server device over the communications network, receiving the data resource at the server system from the server device over the communications network responsive to the request, and parsing the athletic performance information and/or athlete biographical information from the data resource. This approach may be referred to as a web "crawling" or "scraping" operation used to extract information from the data resource without necessarily requiring cooperation with operators of the third-party data resource. However, it will be understood that athletic performance information and/or athlete biographical information may be actively uploaded or otherwise transferred to the server system of the athlete service platform by operators of the third-party data resource as an alternative to web crawling or scraping, or in addition to web crawling or scraping.

As yet another example, the server system may obtain athletic performance information and/or athlete biographical information from event administrators. The server system may generate an event administrator-user interface or a portion thereof at the server system, and transmit the event administrator-user interface or portions thereof to a computing device over the communications network. The athletic performance information and/or athlete biographical information may be at least partially defined by one or more inputs provided via the event administrator-user interface at the computing device.

In some examples, the server system of the athlete service platform may store an indication of the source of the athletic performance information and/or athlete biographical information at the database system. For example, unofficial athletic performance information received from athletes may be distinguished from official athletic performance information received from athletic event administrators. As another example, athlete biographical information received from athletes may be distinguished from athlete biographical information obtained from third-party data resources.

At 312, the method may include obtaining a set of advertisement parameters, which specify how and whether to direct one or more advertisement messages to one or more of the plurality of athlete-user accounts. The set of advertisement parameters may be obtained by receiving the set of advertisement parameters at the server system over a communications network from a computing device.

As one example, the set of advertisement parameters may be defined by one or more inputs provided via an advertiser-user interface at the computing device. The server system may generate the advertiser-user interface or portions thereof at the server system based, at least in part, on a type of the athletic event or the athletic performance information contained within the database system. The server system may transmit the advertiser-user interface or portions thereof to the computing device over the communications network where the advertiser-user interface may be presented via the computing device.

The set of advertisement parameters may be stored at the server system in association with an advertiser-user account. The set of advertisement parameters may include one or more performance parameters. A performance parameter may include any suitable filter or set of filters of athletic performance information. A performance parameter may indicate, for example, one or more of: a parameter type, a magnitude, and/or a condition. As a non-limiting example, an advertiser may define or select a performance parameter that indicates a race finishing time (e.g., a parameter type) of less than (e.g., a condition) a threshold time value (e.g., a magnitude).

As another example, a performance parameter may indicate a first-time achievement parameter. A first-time achievement parameter may indicate an achievement that the athlete has completed for the first time while competing in an athletic event or a portion thereof, a particular type of athletic event, or particular a category or activity within an athletic event. For example, a first-time achievement parameter may indicate a first time that an athlete finished any marathon running event or a particular marathon running event, a first time that an athlete finished in the top five, ten, twenty, etc. finishers, or the first time an athlete qualified for a particular athletic event or type of athletic event that has specified qualification requirements. The first-time achievement parameter may be specified so as to define a first-time achievement that captures other achievements by athletes other than or in addition to a finish place within the event. For example, even if an athlete finishes in last place within an athletic event, that athlete may still have a first-time achievement, such as the first time that the athlete competed in that type of athletic event, the athlete's all-time personal best performance or personal best record, etc.

As another example, a performance parameter may indicate an improvement by an athlete in an outcome of an athletic event, a portion of the athletic event, or a series of athletic events as compared to prior athletic performance of the athlete. This improvement need not be considered a first time for the athlete, but may be a localized improvement. For example, an athlete that retires from a particular athletic event may have reduced performance after emerging from retirement, in which case, the improvement may be relative to the most recent athletic event or number of athletic events.

Performance parameters may be relative to other athletes, such as the other athletes that competed or participated in the athletic event with the athlete. For example, a performance parameter may indicate the ten athletes that have improved their marathon time the most in a given marathon running event since their previous marathon running event. As another example, a performance parameter may indicate the one hundred athletes that have competed in the greatest number of athletic events of a particular type over a particular time period. Accordingly, it will be understood that any suitable performance parameter, or combination of performance parameters may be defined by an advertiser or alternatively by the athlete service platform on behalf of the advertiser for the purpose of targeting certain athletes.

The set of advertisement parameters may alternatively or additionally include one or more biographical parameters. An advertiser may define any suitable biographical parameter, or combination of biographical parameters to filter athletes based on their respective athlete biographical information. As previously described, biographical parameters may include the athlete's name, age, gender, physical characteristics, type of athletic events that the athlete has competed in or plans to compete in, the athlete's residence, a geographic region within which the athlete has competed or plans to compete, etc. As a non-limiting example, an advertiser may specify a biographical parameter to identify female athletes between the ages of 30 and 40 years old that compete in running events located within a particular geographic region.

The set of advertisement parameters may alternatively or additionally include an event participation parameter that indicates upcoming event participation by particular athletes based on forecasted participation and/or known pre-registration by the athletes prior to the athletic event. For example, athletes may pre-register for athletic events through an athlete-user interface of the athlete service platform. Alternatively or additionally, an indication of pre-registration by athletes may be obtained by the athlete service platform from third-party data resources and/or other users. For example, pre-registration information may be obtained by the athlete service platform from event administrators via an event-administrator-user interface. Event participation by athletes may be predicted by the athlete service platform based on athletic performance information obtained from prior athletic events. For example, an athlete that has participated in an annual athletic event for several years or over several occurrences of that athletic event or series of events, may be predicted by the athlete service platform to be participating in an upcoming instance of that athletic event. Accordingly, advertisers may direct advertisements to athletes that are predicted or pre-registered to compete in a particular athletic event before those athletes have competed in the athletic event, series of athletic events, or type of athletic event as specified by the event participation parameter.

The set of advertisement parameters may alternatively or additionally include an offer parameter defining an offer for a product or a service. As non-limiting examples, the offer parameter may define an offer for free or reduced price athletic equipment, free or reduced price equipment repair services, free or reduced price admission and/or acceptance to another athletic event. In some examples, the offer may include an exclusive offer that is not available to the general public. In some examples, an offer parameter may indicate whether the offer for a product or service complies with certain requirements or standards relating to the ability for athletes belonging to a particular organization or athletic governing body from accepting free or reduced price products or services, or from advertisements specifically naming the athlete to which the advertisement was directed. This indication may enable the athlete service platform to direct advertisement to athletes without causing the advertiser, the athlete service platform, or the athletes from violating these requirements or standards.

The set of advertisement parameters specified by an advertiser or on behalf of an advertiser may be applied in combination by the server system. As a non-limiting example, an advertiser may specify that male athletes under the age of 18 competing in cycling events in the state of Oregon having completed at least 3 cycling events in the past 12 months are to receive an offer for a free bicycle. Conversely, an advertiser may specify advertisement parameters to exclude certain types of athletes from receiving advertisement messages.

Continuing with the above example, the advertiser may specify that athletes that are associated with the NCAA (e.g., as indicated by the biographical information of the athlete) are not to receive the offer for the free bicycle if that offer would violate the rules promulgated by the NCAA.

At 314, the method may include identifying, with reference to the plurality of athlete-user accounts and the athletic performance information stored in those athlete-user accounts, one or more target athlete-user accounts associated with one or more athletes that has achieved the performance parameter. In some examples, previously described information processing engine 113 may be configured to identify the one or more target athlete-user accounts. For example, the performance parameter or set of performance parameters specified by an advertiser may be compared to the athletic performance information of a number of athletes by the information processing engine to identify the one or more target athletes matching the one or more specified performance parameters.

As one example, responsive to the first-time achievement parameter, a first-time achievement for the athlete associated with the target-user account may be identified by the information processing engine from the athletic performance information. The target athlete-user account may be alternatively or additionally identified by filtering the plurality of athlete-user accounts based, at least in part, on a comparison of athlete biographical information and one or more specified biographical parameters.

At 316, the method may include directing the advertisement message to the one or more target athlete-user accounts. The advertisement message may include an indication of the performance parameter achieved by the athlete associated with the target athlete-user account. As a non-limiting example, an advertisement message may indicate: "Congratulations for completing your third triathlon!", where the performance parameter indicates that a target athlete must complete 3 or more triathlons. The advertisement message may alternatively or additionally include an offer for a product or a service indicated by the offer parameter. For example, the advertisement message may additionally indicate: "Because you have completed three or more triathlons, please enjoy this coupon for a free pair of running shoes."

The advertisement message may be directed to the target athlete-user account by storing the advertisement message in a profile of the target athlete-user account at the server system. The profile of the target athlete-user account may be published to or accessible via the athlete-user account interface to be presented to the athlete associated with the target athlete-user account and/or other users viewing the athlete's profile. For example, the server system may transmit the athlete-user interface or portions thereof to a client computing device over a communications network in which the athlete-user interface includes the advertisement message. Alternatively or additionally, the advertisement message or notification of its availability in the profile of the target athlete-user account may be directed to the target athlete-user account by sending the advertisement message to an email address, SMS address (e.g., telephone number), physical mailing address, or other suitable address or form of contact associated with the target athlete-user account.

In some examples, the server system may charge a financial fee to an advertiser-user account associated with the advertisement message responsive to directing the advertisement message to a target athlete-user account. For example, advertisers may be charged a financial fee per each athlete-user account that receives the advertisement message. As another example, advertisers may be charged a financial fee for each athlete-user account that acknowledges receipt of the advertisement offer or accepts the offer to obtain the goods or services. Accordingly, advertisers may be charged for delivery of targeted advertisements to athletes.

Figure 4:
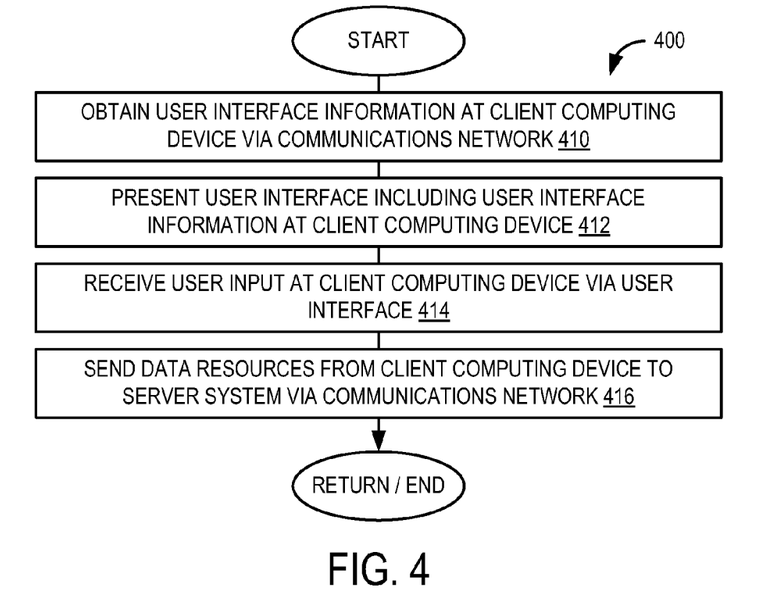
FIG. 4 is a flow diagram depicting an example method for a client computing device communicating with a server system implementing the athlete service platform of FIG. 1.

FIG. 4 is a flow diagram depicting an example method 400 for a client computing device communicating with a server system implementing the athlete service platform of FIG. 1. Method 400 describes an example of how advertisers may direct advertisements for products or services to athletes via an advertiser-user interface.

At 410, the method includes presenting an advertiser-user interface via the client computing device. The advertiser-user interface may include or take the form of a graphical user interface (GUI). A non-limiting example of an advertiser-user interface is described in greater detail with reference to FIG. 8.

At 412, the method includes receiving a set of advertisement parameters at the client computing device via the advertiser-user interface. As previously described, the set of advertisement parameters may include one or more performance parameters, one or more athlete biographical parameters, and/or one or more offer parameters defining an offer for a product or service.

At 414, the method includes sending the advertisement parameters received via the advertiser-user interface from the client computing device to a server system of the athlete service platform via a communications network. As previously described, the advertisement parameters enable the server system to direct advertisement messages to one or more target athlete-user accounts identified from among a plurality of athlete-user accounts. The target athlete-user accounts that are delivered the advertisement message may be associated with athletes having achieved the one or more specified performance parameters as indicated by the athletic performance information stored at or accessible to the server system.

In some examples, the method may further include receiving financial account information at the client computing device for an advertiser-user account via the advertiser-user interface. For example, an advertiser may provide bank account or credit card information to the athlete service platform via the advertiser-user interface. The financial account information may be sent by the client computing device to the server system to enable the server system to charge a financial fee to the advertiser-user account responsive to directing the advertisement message to target athlete-user accounts.

Figure 5:
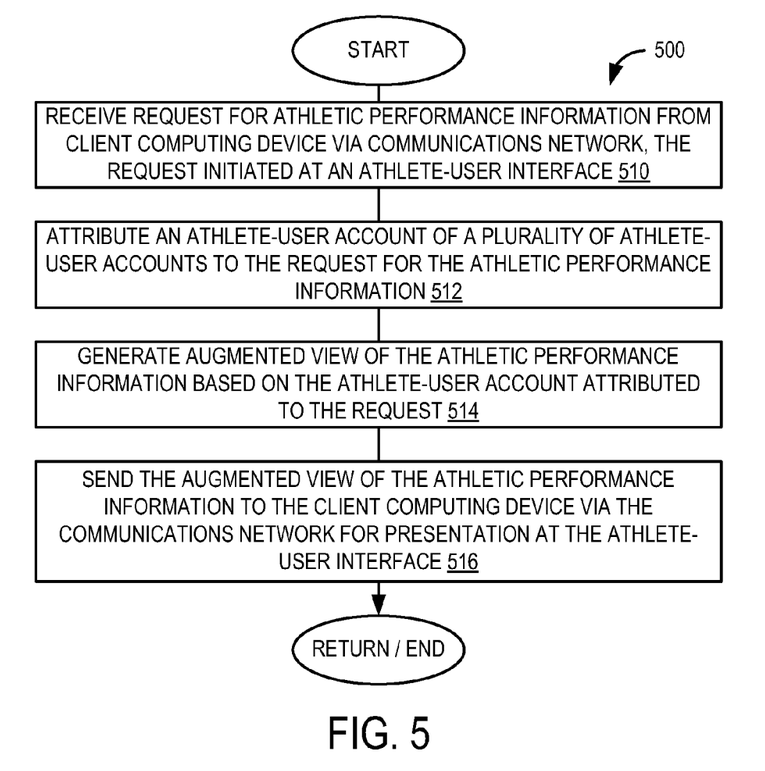
FIG. 5 is a flow diagram depicting an example method for a server system implementing further aspects of the athlete service platform of FIG. 1, including presentation of augmented views of information accessed from a server system of the athlete service platform.

FIG. 5 is a flow diagram depicting an example method 500 for a server system implementing aspects of athlete service platform 100 of FIG. 1. Method 500 describes an example of how users may be provided with an augmented view of the information contained within the database system of the athlete service platform.

At 510, the method includes receiving a request for athletic performance information from a client computing device via a communications network. The request may be initiated at an athlete-user interface of the client computing device.

At 512, the method includes attributing an athlete-user account of a plurality of athlete-user accounts to the request for the athletic performance information. As one example, a user may login to a user account at the athlete service platform by providing username and/or password credentials. Upon login, the user may be presented with the user's account interface and/or access to the user's account profile information. User identifiers associated with the user accounts may enable the server system to distinguish users from each other. For example, each athlete-user account may be associated with a domain unique athlete-user identifier.

At 514, the method includes generating an augmented view of the athletic performance information based on the athlete-user account attributed to the request. The augmented view may be specific to the athlete-user account, and may differ among each of the athlete-user accounts. As one example, the augmented view may include a first indicator defining a first sub-set of the performance information associated with the athlete-user account attributed to the request. The first indicator may take any suitable form to distinguish performance information associated with the athlete-user account from other performance information not associated with the athlete-user account. Non-limiting examples of the first indicator include visual highlighting, bolding, and/or underling of text, graphical icons proximate to the performance information, increased text font size, and/or an ordering of the performance information.

The augmented view may alternatively or additionally include a second indicator defining a second sub-set of the performance information associated with one or more related athlete-user accounts of the plurality of athlete user accounts. The one or more related athlete user accounts may have a predefined relationship to the athlete-user account attributed to the request. For example, the predefined relationship may include one or more related athlete user accounts identified as one or more of: followers, friends, and/or team-mates of the athlete-user account. As with the first indicator, the second indicator may take any suitable form to distinguish performance information associated with the related athlete-user accounts from other performance information not associated with the related athlete-user accounts. Accordingly, the second indicator may differ from the first indicator. Non-limiting examples of the second indicator include visual highlighting, bolding, and/or underling of text, graphical icons, increased text font size, and/or an ordering of the performance information.

At 516, the method includes sending the augmented view of the athletic performance information to the client computing device via the communications network for presentation at the athlete-user interface of the client computing device. Each augmented view may be unique to the individual athlete-user account. For example, the server system may receive requests from a plurality of athlete-user accounts for the athletic performance information. Responsive to each request, the server system may send a specifically tailored augmented view of the athletic performance information to the corresponding athlete-user account attributed to that request.

Figure 6:
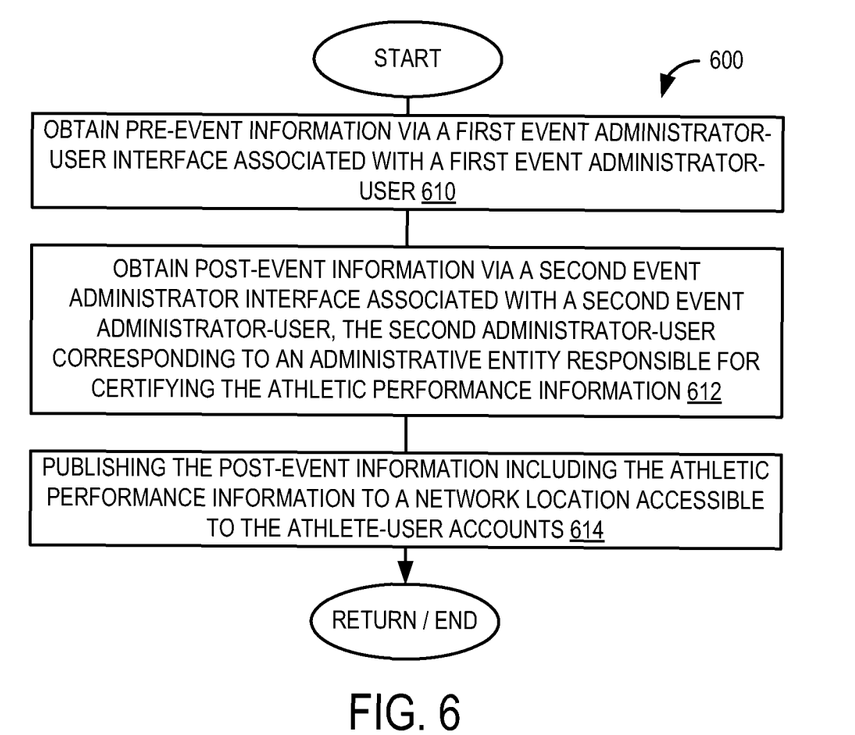
FIG. 6 is a flow diagram depicting an example method for a server system implementing further aspects of the athlete service platform of FIG. 1, including submission of pre-event and post-event information by event administrators.

FIG. 6 is a flow diagram depicting an example method 600 for a server system implementing aspects of athlete service platform 100 of FIG. 1. For example, method 600 describes an example of how users may provide pre-event information and post-event information to the athlete service platform to populate the database system.

At 610, the method may include obtaining pre-event information at the server system via a first event administrator-user interface associated with a first event administrator-user. The pre-event information may indicate one or more event parameters of one or more athletic events prior to athletes competing in the one or more athletic events. For example, the event parameters may indicate an event type or number of event types, an event location or number of event locations, an event date or number of event dates, the identities of athletes or athlete-user accounts registered to compete in the one or more athletic events, or other suitable event information. The pre-event information may further include a permission parameter indicating an identity of a second event administrator-user authorized to submit and/or certify athletic performance information for the one or more athletic events.

At 612, the method may include obtaining post-event information via a second event administrator interface associated with the second event administrator-user. The post-event information may include athletic performance information for a plurality of athlete-user accounts associated with respective athletes after the athletes have competed in the one or more athletic events. The second administrator-user may correspond to an administrative entity responsible for reporting and/or certifying the athletic performance information. Accordingly, the athletic performance information obtained as post-event information via the second event administrator-user interface may be attributed to the second event administrator-user account indicated by the permission parameter previously defined by the first event administrator-user account.

In some examples, the method may further include directing a message by the server system to the second event administrator-user account indicated by the permission parameter. The message may indicate the one or more event parameters. The message may take the form of a pre-event message directed to the second event administrator-user account prior to the athletes associated with the plurality of athlete-user accounts compete in the one or more athletic events. A post-event message may be alternatively or additionally directed by the server system to the second event administrator-user account after the athletes compete in the one or more athletic events. The post-event message may indicate the one or more event parameters and/or may include a reminder to the second event administrator user to submit the post-event information via the second event administrator-user interface. Pre-event and post-event messages may be delivered as an email, SMS message, or other suitable form of communication.

At 614, the method may include publishing the post-event information including the athletic performance information to a network location accessible to the athlete-user accounts. As one example, the network location may include the database system of the athlete service platform. Alternatively or additionally, the network location may include a third-party data resource hosted at a server device of the communications network.

In some examples, the athletic performance information may include provisional athletic performance information. The method may further include obtaining updated athletic performance information for at least some of the plurality of athlete-user accounts. The updated athletic performance information may differ from at least some of the provisional athletic performance information for an athlete-user account attributed to a request. The method may further include directing a message to the athlete-user account attributed to the request in which the message indicates the updated athletic performance information. Messages may be directed to other user-accounts indicating the updated athletic performance information, including advertisers, event administrators, followers, coaches, etc.

In some examples, advertisers may also be provided with augmented views of the performance information. Augmented views for advertisers may differ from the augmented views provided to athletes. For example, the method may further include receiving a second request for the athletic performance information from a second client computing device via a communications network. The second request may be initiated at an advertiser-user interface of the second client computing device. The method may include attributing an advertiser-user account to the second request for the athletic performance information. A second augmented view of the athletic performance information may be generated by the server system based on the advertiser-user account attributed to the request. The second augmented view may include an indicator defining a sub-set of the performance information associated with one or more athlete-user accounts to which the advertiser-user account has directed an advertisement message or has not yet directed an advertisement message. The method may further include sending the second augmented view of the athletic performance information to the second client computing device via the communications network for presentation at the advertiser-user interface of the second client computing device. Accordingly, the advertiser-user interface may enable an advertiser to distinguish between athletes that have already received offers for products or services from the advertiser and athletes that have not received the offers.

In some examples, the second augmented view of the athletic performance information provided to advertisers may further indicate a quantity of one or more related athlete user accounts having a predefined relationship to the athlete-user account. As previously described, the predefined relationship may include one or more related athlete user accounts identified as one or more of: followers, friends, and/or team-mates of an athlete-user account. Accordingly, the advertiser-user interface enables advertisers to direct offers for products or services to athletes having a large number of followers, friends, and/or team-mates to increase the impact of product placement among users of the athlete service platform.

In some examples, the method may further include receiving a request for the athletic performance information at the server system from a third client computing device via a communications network. The request may be initiated at a team manager-user interface of the third client computing device. The server system may attribute a team manager-user account (e.g., associated with a team manager or coach) to the request for the athletic performance information initiated at the team manager-user interface. The server system may generate an augmented view of the athletic performance information based on the team manager-user account attributed to the request. The augmented view may include an indicator defining a sub-set of the performance information associated with one or more athlete-user accounts managed or coached by the team manager-user account. The server system may send the augmented view of the athletic performance information to the third client computing device via the communications network for presentation at the team manager-user interface of the third client computing device.

Figure 7:
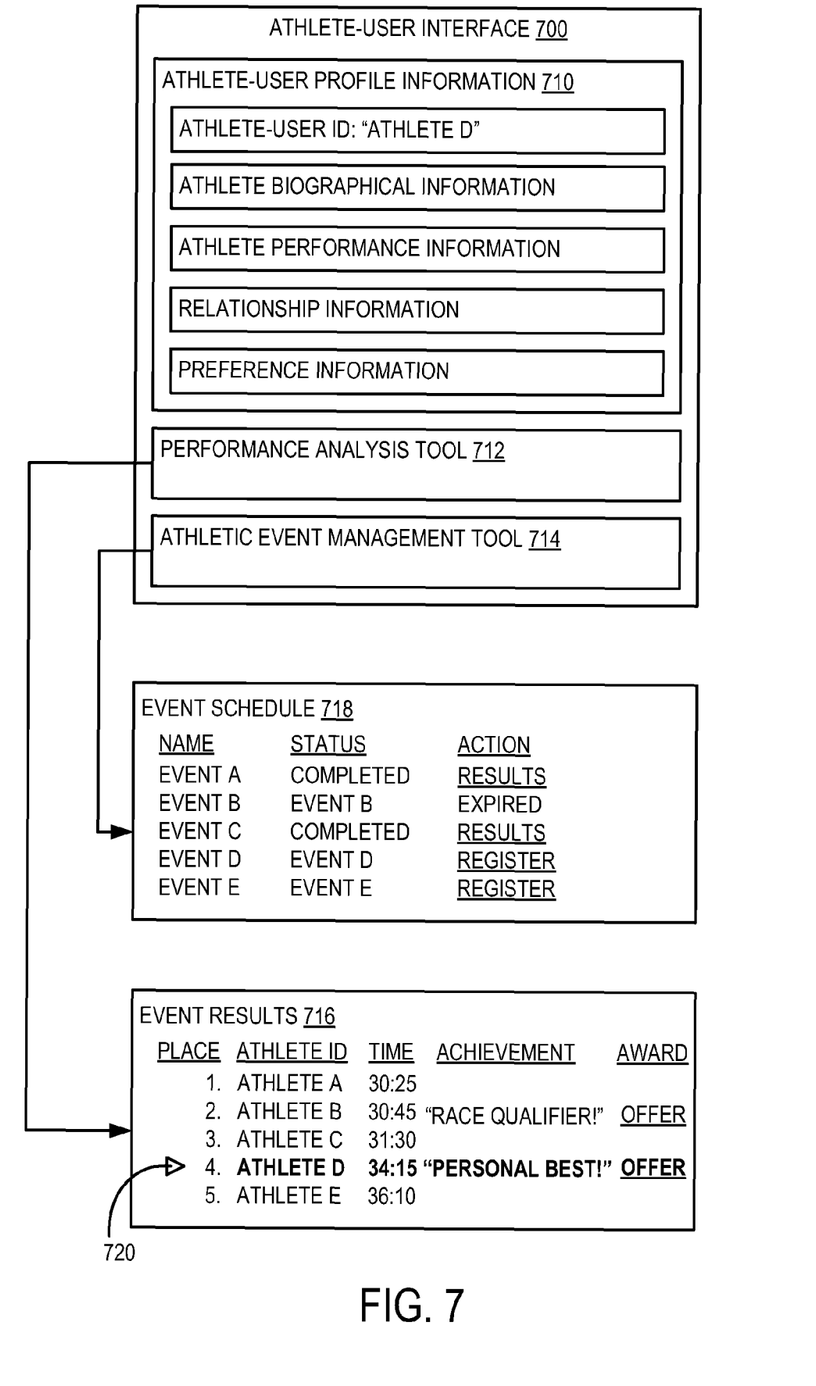
FIG. 7 is a schematic diagram depicting an example athlete-user interface.

FIG. 7 is a schematic diagram depicting an example athlete-user interface 700. Athlete-user interface 700 may be presented as a graphical user interface (GUI) at a client computing device communicating with athlete service platform 100 of FIG. 1 via a communications network. Athlete-user interface 700 may include athlete-user profile information 710, which may include one or more of: an athlete-user identifier, athlete biographical information, athletic performance information, relationship information indicating related athlete-user accounts having a predefined relationship to the athlete-user account, preference information, or other suitable information.

Athlete-user interface 700 may include a performance analysis tool 712. Performance analysis tool 712 is a non-limiting example of user tools 112 of FIG. 1. Performance analysis tool 712 may enable an athlete to be presented with an augmented view of athletic performance information that is specifically tailored to that athlete. An example of this augmented view may take the form of event results 716. In this example augmented view, the athletic performance information for the athlete-user account (e.g., ATHLETE D) includes an indicator (e.g., an icon 720 and/or bolded text relative to the text of other performance information) defining a sub-set of the performance information associated with the athlete-user account. Event results 716 further includes an indication of a first-time achievement by the athlete (e.g., a personal best), and a selectable link for the athlete to access an offer for products or services delivered to the athlete-user account as an advertisement message responsive to the first-time achievement.

Athlete-user interface 700 may include an event management tool 714. Event management tool 714 may enable an athlete to be presented an event schedule 718, including upcoming athletic events, athletic events that have been completed by the athlete, and/or expired events that have already occurred. Event schedule 718 may enable an athlete to be presented with an augmented view of the event schedule that is specifically tailored to that athlete. For example, athletes that have or plan on competing in cycling events or particular types of cycling events may be presented with upcoming cycling events that are relevant to those athletes as determined by the athlete service platform. Relevant events may be graphical emphasized over non-relevant or less relevant events, and/or non-relevant or less relevant events may be excluded from presentation to the athletes. As one example, an athlete that resides in Oregon and has participated in a number of cycling events may be presented with a list of upcoming cycling events in Oregon that excludes other geographic regions and/or types of athletic events. By contrast, an athlete that resides in New York state that has participated in running events may be presented with running events near or within the New York region. An augmented view of an event schedule may also indicate and/or emphasize athletic events for which the athlete is pre-registered or is predicted by the athlete service platform to be attending. Event management tool 714 may also enable athletes to register (i.e., pre-register) for athletic events. In response to an athlete registering for an athletic event, the athlete service platform may facilitate a financial transaction for the registration fee using financial transaction/account information stored in the athlete's biographical or preference information. Event management tool 714 may also enable an athlete to view results of completed athletic events, including the previously described augmented view of the athletic performance information.

Figure 8:
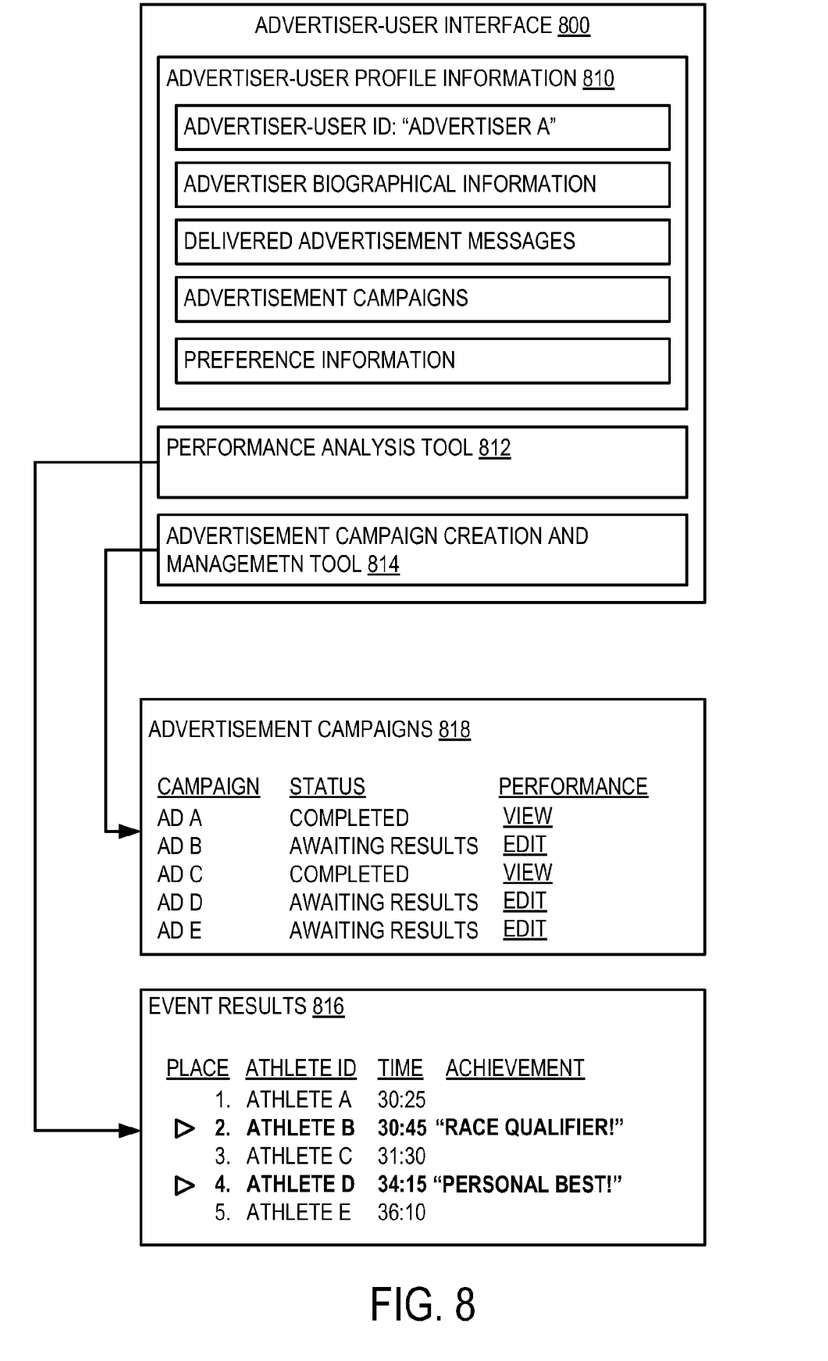
FIG. 8 is a schematic diagram depicting an example advertiser-user interface.

FIG. 8 is a schematic diagram depicting an example advertiser-user interface 800. Advertiser-user interface 800 may be presented as a GUI at a client computing device communicating with athlete service platform 100 of FIG. 1 via a communications network. Advertiser-user interface 800 may include advertiser-user profile information 810, which may include one or more of: an advertiser-user identifier, advertiser biographical information, an indication of delivered advertisement messages, a listing of advertisement campaigns, preference information, or other suitable information.

Advertiser-user interface 800 may include a performance analysis tool 812, enabling advertisers to be presented with an augmented view of athletic performance information as depicted, for example, as event results 816. For example, in events 816, athlete-user accounts indicated as ATHLETE B and ATHLETE D, and associated performance information are augmented with graphical icons and/or bolded text to indicate that the advertiser has already directed offers for products or services to these athlete-user accounts. In some examples, the advertiser-user interface may enable an advertiser to select individual athlete-user accounts from the augmented view of the athletic performance information to direct advertisement messages.

Advertiser-user interface 800 may include an advertisement campaign creation and management tool 814, enabling advertisers to be presented with an indication of advertisement campaigns 818. Advertisement campaigns 818 may indicate completed campaigns in which advertisement messages have been delivered to athlete-user accounts. Advertisement campaigns 818 may indicate pending campaigns in which event results have not yet been received by the athlete service platform or for which advertisement messages have not yet been directed to athlete-user accounts. Advertisers may view the performance of completed campaigns, such as the number of athlete-user accounts that have been delivered advertisement messages, the identity of those athlete-user accounts, and the fees charged to the advertisement-user account for delivery of those advertisement messages. Advertisers may also edit pending campaigns or create new campaigns by specifying new advertisement parameters.

Figure 9:
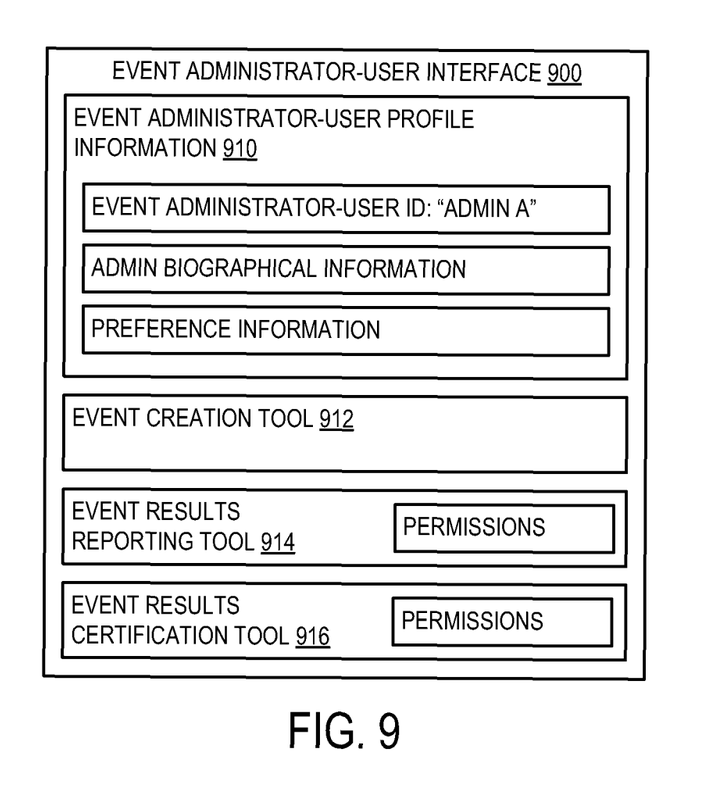
FIG. 9 is a schematic diagram depicting an example event administrator-user interface.

FIG. 9 is a schematic diagram depicting an example event administrator-user interface 900. Event administrator-user interface 900 may be presented as a GUI at a client computing device communicating with athlete service platform 100 of FIG. 1 via a communications network. Event administrator-user interface 900 may include event administrator-user profile information 910, which may include one or more of: an event administrator-user identifier, event administrator biographical information, preference information, or other suitable information.

Event administrator-user interface 900 may include an event creation tool 912, enabling an event administrator to create and/or manage an athletic event or series of athletic events. An athletic event administrator may define event parameters via event creation tool 912, including the type of athletic event, the date of the athletic event, the location of the athletic event, or other suitable event parameters.

Event administrator-user interface 900 may include an event results reporting tool 914, enabling an event administrator-user to submit event results including athletic performance information for athletes competing in the athletic event. Event results reporting tool 914 may further enable the event-administrator-user to define permissions that enable another event-administrator (e.g., an official reporting entity) to submit event results.

Event administrator-user interface 900 may include event results certification tool 916, enabling an event administrator-user to certify event results that are reported via reporting tool 914. Event results certification tool 916 may further enable the event-administrator-user to define permissions that enable another event-administrator (e.g., an official certifying entity) to certify the event results.

The example user interfaces and augmented views described herein may be accessed by and presented to other users or different types of users. For example, an advertiser may be presented with an augmented view of a particular athlete (e.g., event schedule 718 and event results 716) by the advertiser navigating to the athlete's profile. As another example, a team coach or fans of a particular athlete may be presented with an athlete's upcoming athletic events by navigating to that athlete's profile.

Figure 10:
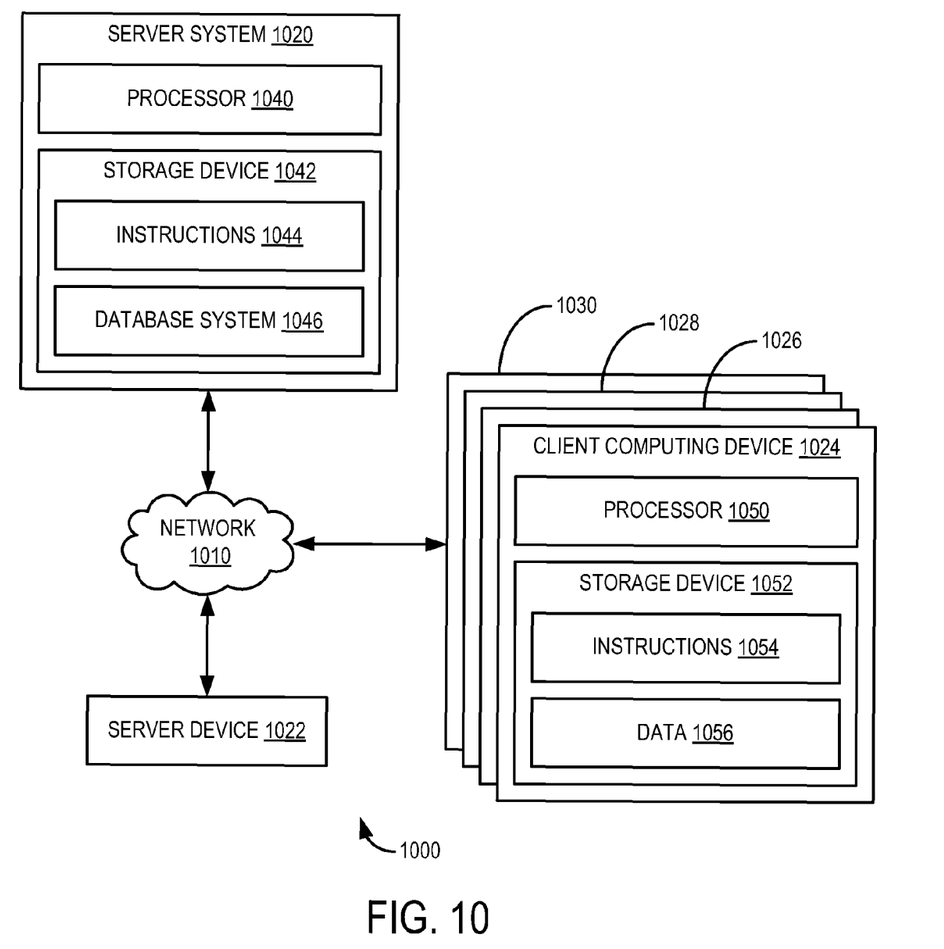
FIG. 10 is a schematic diagram depicting an example computing system.

FIG. 10 is a schematic diagram depicting an example computing system 1000. Computing system 1000 is a non-limiting example of a use environment for athlete service platform 100 of FIG. 1. Computing system 1000 includes a number of computing devices that are configured to communicate with each other via a communications network 1010. These computing devices may include a server system 1020, a third-party server device 1022, and a plurality of client computing devices 1024, 1026, 1028, 1030, etc. Communications network 1010 may include or take the form of the Internet or a portion thereof.

Server system 1020 may correspond to the previously described server system for implementing athlete service platform 100 of FIG. 1. Server system 1020 may include one or more server devices. In some examples, multiple server devices of server system 1020 may reside at remote geographic locations from each other, in which case the multiple server devices may communicate with each other via communications network 1110. Server system 1020 may include a processor 1040 to execute instructions (e.g., software and/or firmware programs). Server system 1020 may include a storage device 1042 having instructions 1044 stored thereon executable by processor 1040 to perform or otherwise implement one or more of the methods or operations described herein with respect to the athlete service platform. For example, aspects of instructions 1044 may include or take the form of previously described user tools 112 and information processing engine 113. Storage device 1042 may further include a database system 1046, which may correspond to previously described database system 112 of FIG. 1.

Third-party server device 1022 may correspond to the previously described server device hosting third-party data resource 122 of FIG. 1. Third-party server device 1022 may include a storage device containing the third-party data resource that may be received by server system 1020 to populate database system 1046. Alternatively or additionally, some or all of the information contained in database system 1046 may be published to server device 1022, which in turn may be accessed by client computing devices via communications network 1010. For example, server device 1022 may include a software portal or widget, or other suitable application that accesses information contained within database system 1046, and presents the information via a data resource hosted at server device 1022. Server system 1020 and/or server device 1022 may support application programming interfaces (API)s to enable information to be shared between server system 1020 and server device 1022. Accordingly, server device 1022 may provide an additional or alternative network access point where users may access information stored at database system 1046 and/or submit information to database system 1046.

The client computing devices of FIG. 10 are described in greater detail with respect to example client computing device 1024. Client computing device 1024 may include a processor 1050 to execute instructions (e.g., software and/or firmware programs). Client computing device 1024 may include a storage device 1052 having instructions 1054 stored thereon executable by processor 1050 to perform or otherwise implement one or more of the methods or operations described herein with respect to client computing devices. In some examples, portions of instructions 1054 may include or take the form of a general purpose web browser application program or a special purpose application program specifically configured for use with the athlete service platform. These application programs may be configured to present the user interfaces described herein via a graphical display device, for example.

The invention claimed is:

1. A method for a server system including one or more storage devices, comprising:
   obtaining athletic performance information and selectively storing that information in a plurality of athlete-user accounts on the one or more storage devices, each athlete-user account being associated with a respective athlete competing in one or more athletic events;

receiving a request for the athletic performance information from a client computing device via a communications network, the request initiated at an athlete-user interface of the client computing device;

attributing an athlete-user account of the plurality of athlete-user accounts to the request for the athletic performance information;

generating an augmented view of the athletic performance information based on the athlete-user account attributed to the request, the augmented view including:
- a first indicator defining a first sub-set of the performance information associated with the athlete-user account attributed to the request, and
- a second indicator defining a second sub-set of the performance information associated with one or more related athlete-user accounts of the plurality of athlete-user accounts, the one or more related athlete-user accounts having a predefined relationship to the athlete-user account attributed to the request;

sending the augmented view of the athletic performance information to the client computing device via the communications network for presentation at the athlete-user interface of the client computing device;

receiving a second request for the athletic performance information from a second client computing device via the communications network, the second request initiated at an advertiser-user interface of the second client computing device;

attributing an advertiser-user account to the second request for the athletic performance information;

generating a second augmented view of the athletic performance information based on the advertiser-user account attributed to the request, the second augmented view including:
- a third indicator defining a third sub-set of the performance information associated with one or more athlete-user accounts to which the advertiser-user account has directed an advertisement message; and sending the second augmented view of the athletic performance information to the second client computing device via the communications network for presentation at the advertiser-user interface of the second client computing device.

2. The method of claim 1, further comprising:
obtaining pre-event information via an event administrator-user interface, the pre-event information including one or more event parameters of the one or more athletic events prior to the athletes associated with the plurality of athlete-user accounts competing in the one or more athletic events; and wherein the athletic performance information is obtained as post-event information via the event administrator-user interface, the post-event information including the athletic performance information for the plurality of athlete-user accounts after the athletes compete in the one or more athletic events.

3. The method of claim 1, further comprising:
obtaining pre-event information via an event administrator-user interface, the pre-event information including a permission parameter, and further including one or more event parameters of the one or more athletic events prior to the athletes associated with the plurality of athlete-user accounts competing in the one or more athletic events;

wherein the athletic performance information is obtained as post-event information via a second event administrator-user interface attributed to a second event administrator-user account indicated by the permission parameter, the post-event information including the athletic performance information for the plurality of athlete-user accounts after the athletes compete in the one or more athletic events.

4. The method of claim 3, further comprising:
directing a message to the second event administrator-user account indicated by the permission parameter, the message indicating the one or more event parameters.

5. The method of claim 4, wherein the message is a pre-event message directed to the second event administrator-user account prior to the athletes associated with the plurality of athlete-user accounts competing in the one or more athletic events; and wherein the method further comprises directing a post-event message to the second event administrator-user account after the athletes compete in the one or more athletic events, the post-event message indicating the one or more event parameters, and including a reminder to submit the post-event information via the second event administrator-user interface.

6. The method of claim 3, wherein the second event administrator-user account corresponds to an administrative entity responsible for certifying the athletic performance information.

7. The method of claim 1, wherein the athletic performance information includes provisional athletic performance information; and wherein the method further comprises:
- obtaining updated athletic performance information and selectively storing that information in at least some of the plurality of athlete-user accounts;
- the updated athletic performance information differing from at least some of the provisional athletic performance information for the athlete-user account attributed to the request; and
- directing a message to the athlete-user account attributed to the request, the message indicating the updated athletic performance information.

8. The method of claim 1, wherein the second augmented view of the athletic performance information further indicates a quantity of the one or more related athlete-user accounts having the predefined relationship to the athlete-user account.

9. The method of claim 8, wherein the predefined relationship includes the one or more related athlete-user accounts identified as one or more of: followers, friends, and/or teammates of the athlete-user account.

10. A server system, comprising:
a processor; and
a storage device having instructions stored thereon executable by the processor to:
- obtain pre-event information via a first event administrator-user interface associated with a first event administrator-user, the pre-event information including a permission parameter, and further indicating one or more event parameters of one or more athletic events prior to athletes competing in the one or more athletic events; and
- obtain post-event information via a second event administrator-user interface associated with a second event administrator-user, the post-event information including athletic performance information for a plurality of athlete-user accounts associated with respective athletes after the athletes compete in the one or more athletic events, the second event administrator-user corresponding to an administrative entity responsible for certifying the athletic performance information;

publish post-event information including the athletic performance information to a network location accessible to the athlete-user accounts;

receive a request for the athletic performance information from a client computing device via a communications network, the request initiated at an advertiser-user interface of the client computing device;

attribute an advertiser-user account to the request for the athletic performance information;

generate an augmented view of the athletic performance information based on the advertiser-user account attributed to the request, the augmented view including an indicator defining a sub-set of the performance information associated with one or more athlete-user accounts to which the advertiser-user account has directed an advertisement message; and send the augmented view of the athletic performance information to the client computing device via the communications network for presentation at the advertiser-user interface of the client computing device.

11. The server system of claim 10, wherein the instructions are further executable by the processor to:
receive requests from the plurality of athlete-user accounts for the athletic performance information;
responsive to each request, send an augmented view of the athletic performance information to the corresponding athlete-user account, the augmented view including:
a first indicator defining a first sub-set of the performance information associated with the athlete-user account attributed to that request.

12. The server system of claim 11, wherein the augmented view further includes:
a second indicator defining a second sub-set of the performance information associated with one or more related athlete-user accounts of the plurality of athlete-user accounts, the one or more related athlete-user accounts having a predefined relationship to the athlete-user account attributed to that request;
wherein the predefined relationship includes the one or more related athlete-user accounts identified as one or more of: followers, friends, and/or team-mates of the athlete-user account.

13. The server system of claim 10, wherein the instructions are further executable by the processor to:
direct a pre-event message to the second event administrator-user account prior to the athletes associated with the plurality of athlete-user accounts competing in the one or more athletic events; and
wherein the method further comprises directing a post-event message to the second event administrator-user account after the athletes compete in the one or more athletic events, the post-event message indicating the one or more event parameters, and including a reminder to submit the post-event information via the second event administrator-user interface.

14. The server system of claim 10, wherein the instructions are further executable by the processor to:
obtain updated athletic performance information and selectively store that information in at least some of the plurality of athlete-user accounts, the updated athletic performance information differing from at least some of the athletic performance information for an athlete-user account; and direct a message to the athlete-user account indicating the updated athletic performance information.

15. The server system of claim 10, where the augmented view of the athletic performance information further indicates a quantity of one or more related athlete-user accounts having a predefined relationship to the athlete-user account.

16. The server system of claim 10, wherein the instructions are further executable by the processor to:
receive a request for the athletic performance information from a client computing device via a communications network, the request initiated at a team manager-user interface of the client computing device;
attribute a team manager-user account to the second request for the athletic performance information;
generate an augmented view of the athletic performance information based on the team manager-user account attributed to the request, the augmented view including:
an indicator defining a sub-set of the performance information associated with one or more athlete-user accounts managed by the team manager-user account; and
send the augmented view of the athletic performance information to the client computing device via the communications network for presentation at the team manager-user interface of the client computing device.

17. A server system, comprising:
a processor; and
a storage device having instructions stored thereon executable by the processor to:
obtain pre-event information via a first event administrator-user interface associated with a first event administrator-user, the pre-event information including a permission parameter, and further indicating one or more event parameters of one or more athletic events prior to athletes competing in the one or more athletic events; and
obtain post-event information via a second event administrator interface associated with a second event administrator-user, the post-event information including athletic performance information for a plurality of athlete-user accounts associated with respective athletes after the athletes compete in the one or more athletic events, the second administrator-user corresponding to an administrative entity responsible for certifying the athletic performance information;
publish the post-event information including the athletic performance information to a network location accessible to the athlete-user accounts;
receive a request for the athletic performance information from a client computing device via a communications network, the request initiated at an advertiser-user interface of the client computing device;
attribute an advertiser-user account to the request for the athletic performance information;
generate an augmented view of the athletic performance information based on the advertiser-user account attributed to the request, the augmented view including an indicator defining a sub-set of the performance information associated with one or more athlete-user accounts to which the advertiser-user account has directed an advertisement message;
send the augmented view of the athletic performance information to the client computing device via the communications network for presentation at the advertiser-user interface of the client computing device;

receive a request for the athletic performance information from the client computing device via the communications network, the request initiated at an athlete-user interface of the client computing device;

attribute an athlete-user account of the plurality of athlete-user accounts to the request for the athletic performance information;

generate an augmented view of the athletic performance information based on the athlete-user account attributed to the request, the augmented view including:
- a first indicator defining a first sub-set of the performance information associated with the athlete-user account attributed to the request, and
- a second indicator defining a second sub-set of the performance information associated with one or more related athlete-user accounts of the plurality of athlete-user accounts, the one or more related athlete-user accounts having a predefined relationship to the athlete-user account attributed to the request; and send the augmented view of the athletic performance information to the client computing device via the communications network for presentation at the athlete-user interface of the client computing device.

* * * * *